US009383954B2

United States Patent
Ohhashi

(10) Patent No.: US 9,383,954 B2
(45) Date of Patent: Jul. 5, 2016

(54) NON-TRANSITORY STORAGE MEDIUM STORING PROGRAM CAPABLE OF CHANGING OPERATION MODE OF IMAGE PROCESSING APPARATUS AND IMAGE PROCESSING APPARATUS CAPABLE OF CHANGING OPERATION MODE

(71) Applicant: BROTHER KOGYO KABUSHIKI KAISHA, Nagoya-shi, Aichi-ken (JP)

(72) Inventor: Masashi Ohhashi, Kasugai (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/668,541

(22) Filed: Mar. 25, 2015

(65) Prior Publication Data

US 2015/0277815 A1     Oct. 1, 2015

(30) Foreign Application Priority Data

Mar. 31, 2014  (JP) ................................ 2014-072705

(51) Int. Cl.
 *G06F 3/12*  (2006.01)
(52) U.S. Cl.
 CPC ............ *G06F 3/1231* (2013.01); *G06F 3/1285* (2013.01)
(58) Field of Classification Search
 CPC .................................................. G06F 3/1231
 USPC ....................... 358/1.13, 1.15, 1.12
 See application file for complete search history.

(56) References Cited

U.S. PATENT DOCUMENTS

| 2009/0109466 A1 | 4/2009 | Yoshikawa et al. |
| 2010/0003047 A1* | 1/2010 | Achiwa .............. G03G 15/6538 399/85 |
| 2012/0013667 A1* | 1/2012 | Snyder ..................... B41J 11/42 347/16 |

FOREIGN PATENT DOCUMENTS

| JP | 2007050566 A | 3/2007 |
| JP | 2012053374 A | 3/2012 |

* cited by examiner

Primary Examiner — Jacky X Zheng
(74) Attorney, Agent, or Firm — Merchant & Gould P.C.

(57) ABSTRACT

A non-transitory storage medium storing a program executable by a computer of a control device that controls a recording device and a reading device, wherein, when the control device receives a command for a cooperative operation in which the reading device reads an image from a recording medium and the recording device records the read image on a recording medium, the program causes the control device to: obtain, from each of the recording device and the reading device, operation mode information relating to an operation mode set for each of the recording device and the reading device; and where the operation mode information of the recording device or the reading device indicates a quiet mode and the operation mode information of the other of the recording device and the reading device does not indicate the quiet mode, control the other of the recording device and the reading device to perform a quiet operation.

14 Claims, 7 Drawing Sheets

NON-TRANSITORY STORAGE MEDIUM STORING PROGRAM CAPABLE OF CHANGING OPERATION MODE OF IMAGE PROCESSING APPARATUS AND IMAGE PROCESSING APPARATUS CAPABLE OF CHANGING OPERATION MODE

CROSS REFERENCE TO RELATED APPLICATION

The present application claims priority from Japanese Patent Application No. 2014-072705, which was filed on Mar. 31, 2014, the disclosure of which is herein incorporated by reference in its entirety.

BACKGROUND OF THE INVENTION

1. Field of the Invention

The present invention relates to a non-transitory storage medium storing a program executable by a computer of a controller configured to control a recording device for recording an image on a recording medium and a reading device for reading an image recorded on a recording medium. The invention also relates to an image processing apparatus.

2. Description of the Related Art

When quietness or low noise takes precedence over a printing speed, known printers permit selection of a quiet mode (silent mode) in which a sheet conveyance speed is lowered to thereby reduce mechanical noise.

SUMMARY OF THE INVENTION

In a cooperative operation in which an image read by a scanner is printed by a printer, even where the printing operation by the printer is performed in a quiet mode, quietness would be impaired if a sheet is conveyed by the scanner at a normal speed.

The present invention has been developed to provide an image processing apparatus that reduces impairment of quietness when one of a recording device and a reading device operates in a quiet mode and to provide a non-transitory storage medium storing a program for reducing impairment of quietness.

The present invention provides a non-transitory storage medium storing a program executable by a computer of a control device configured to control a recording device configured to record an image on a recording medium while conveying the recording medium and a reading device configured to read an image recorded on a recording medium while conveying the recording medium, wherein, when the control device receives a command for a cooperative operation in which the reading device reads an image from a recording medium and the recording device records the read image on a recording medium, the program causes the control device to: obtain, from each of the recording device and the reading device, operation mode information relating to an operation mode set for each of the recording device and the reading device; and where the operation mode information of one of the recording device and the reading device indicates a quiet mode and the operation mode information of the other of the recording device and the reading device does not indicate the quiet mode, control the other of the recording device and the reading device to perform a quiet operation.

The present invention provides an image processing apparatus, comprising: a recording device configured to record an image on a recording medium while conveying the recording medium; a reading device configured to read an image recorded on a recording medium while conveying the recording medium; and a control device configured to control the recording device and the reading device, wherein, when the control device receives a command for a cooperative operation in which the reading device reads an image from a recording medium and the recording device records the read image on a recording medium, the control device: obtains, from each of the recording device and the reading device, operation mode information relating to an operation mode set for each of the recording device and the reading device; and where the operation mode information of one of the recording device and the reading device indicates a quiet mode and the operation mode information of the other of the recording device and the reading device does not indicate the quiet mode, the control device controls the other of the recording device and the reading device to perform a quiet operation.

BRIEF DESCRIPTION OF THE DRAWINGS

The objects, features, advantages, and technical and industrial significance of the present invention will be better understood by reading the following detailed description of the embodiments of the invention, when considered in connection with the accompanying drawings, in which.

DETAILED DESCRIPTION OF THE EMBODIMENTS

First Embodiment

Figure 1:
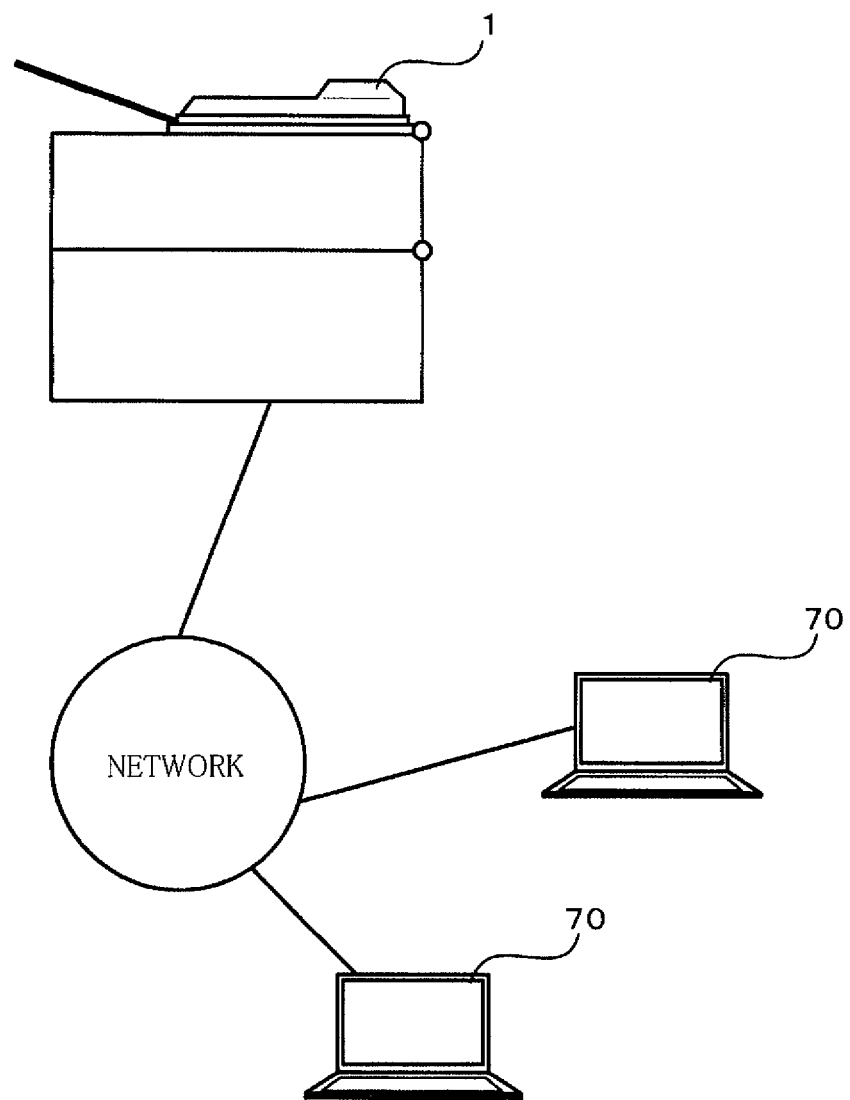
FIG. 1 is a schematic view showing a network to which a multi-function peripheral (MFP) according to a first embodiment of the present invention is connected.

There will be explained hereinafter an image processing apparatus according to one embodiment of the invention with reference to the drawings. In the present embodiment, the principle of the invention is applied to a multi-function peripheral (MFP) having a scanning function and a printing function. As shown in FIG. 1, personal computers (PCs) 70 and an MFP 1 are connected to the same network.

Figure 2:
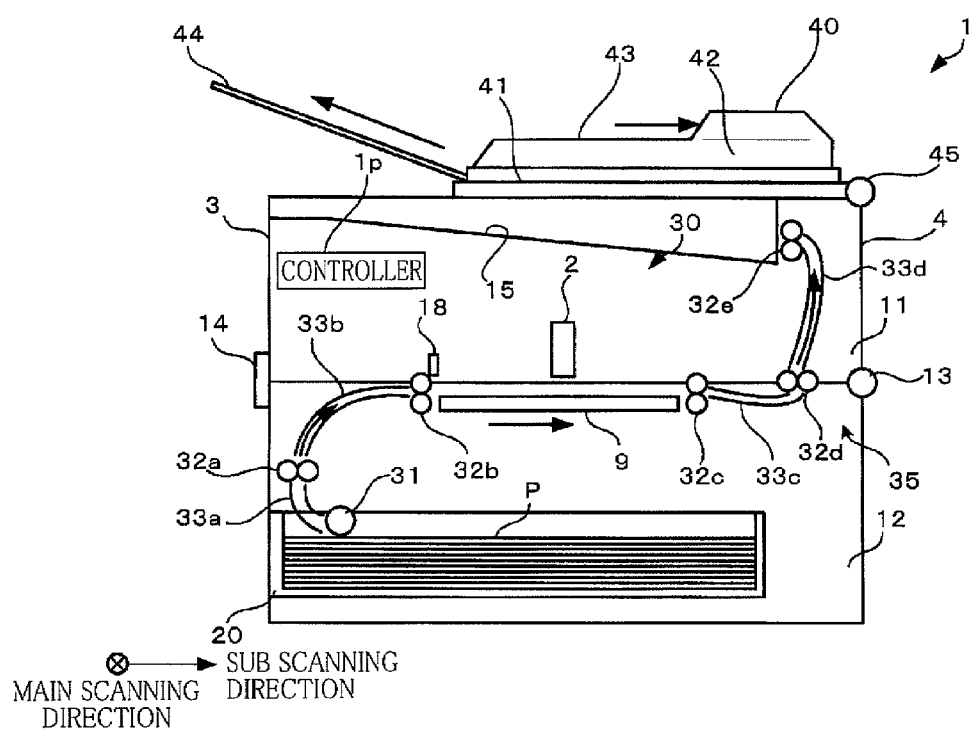
FIG. 2 is a schematic side view showing an internal structure of the MFP of FIG. 1.

As shown in FIG. 2, the MFP 1 has an upper housing 11 and a lower housing 12 each having a rectangular parallelepiped shape. The MFP 1 has a front surface 3 (a left surface in FIG. 2) and a rear surface 4 (a right surface in FIG. 2). The upper housing 11 is open on its lower side while the lower housing 12 is open on its upper side. The upper housing 11 is coupled to the lower housing 12 so as to be pivotable about a pivot shaft 13. A sheet support portion 15 is provided on an upper surface of the upper housing 11. Sheets P discharged after printing thereon has been completed are sequentially placed onto the sheet support portion 15.

A printer 30, a sheet tray 20, and a platen 9 are provided in the MFP 1. The printer 30 includes an ink-jet head 2 and a conveyor mechanism 35.

The ink-jet head 2 has a lower surface functioning as an ejection surface in which a plurality of nozzles are formed for ejecting ink droplets. The sheet tray 20 can support a plurality of stacked sheets P. The sheet tray 20 is detachably disposed on a bottom surface of the lower housing 12. The platen 9 is a plate member for supporting a sheet. The platen 9 is fixed to the lower housing 12 so as to face the ejection surface of the ink-jet head 2 when the upper housing 11 is closed.

The conveyor mechanism 35 defines a sheet conveyance path extending from the sheet tray 20 to the sheet support portion 15 via the ink-jet head 2 and the platen 9. The conveyor mechanism 35 includes a pickup roller 31, nip rollers 32a-32e, guides 33a-33d, and a motor 35a (FIG. 3) configured to drive, via gears not shown, the pickup roller 31 and the nip rollers 32. The pickup roller 31 supplies an uppermost one of the sheets P stacked on the sheet tray 20. The nip rollers 32a-32e are disposed along the sheet conveyance path to give a conveyance force to the sheet P. The guides 33a-33d are disposed in the sheet conveyance path between the pickup roller 31 and the nip rollers 32a-32e. Each of the guides 33a-33d guides the sheet P to which a corresponding one of the nip rollers 32a-32e has given a conveyance force until the sheet P reaches the next one of the nip rollers 32a-32e. When the sheet P conveyed by the conveyor mechanism 35 passes through a print area located between the ink jet head 2 and the platen 9, the ink-jet head 2 ejects ink droplets from the nozzles onto the sheet P to print an image thereon. The sheet P on which an image has been printed is placed on the sheet support portion 15.

A sheet sensor 18 is disposed immediately downstream of the nip roller 32b in the conveyance path. When a downstream or leading edge, in a sheet conveyance direction, of the sheet P that is being conveyed by the conveyor mechanism 35 passes below the sheet sensor 18, an output signal generated by the sheet sensor 18 changes. On the basis of timing of this change, timing of ejection of the ink droplets from the nozzles of the ink-jet head 2 is determined.

A scanner unit 40 is provided on the upper surface of the upper housing 11 so as to partly cover the sheet support portion 15. The scanner unit 40 includes a scanner main body 41 and a feeder 42 disposed on an upper surface of the scanner main body 41. A sheet supply tray 43 is formed on an upper surface of the feeder 42. A document (sheet) set on the sheet supply tray 43 is moved rightward in FIG. 1 by the feeder 42 and turns by 180° at a right end portion of the feeder 42 with the upper surface of the sheet exposed outside, so that the sheet is turned upside down. The sheet then passes on an upper surface of the scanner main body 41, i.e., a reading portion (not shown), and is thereafter discharged onto a sheet output tray 44 from a left portion of the feeder 42 in FIG. 1. When the sheet passes through the reading portion of the scanner main body 41, the scanner main body 41 reads an image formed on one or both of surfaces of the sheet and creates image data. A plurality of documents can be stacked on the sheet supply tray 43, and the documents can be read successively.

A reading surface (not shown), on which a document can be directly placed, is formed on the upper surface of the scanner main body 41. When the feeder 42 is pivoted upward about a shaft 45, the reading surface (flat bed) of the scanner main body 41 is exposed. A document can be set directly on the exposed reading surface, and the scanner main body 41 can read a document solely.

Figure 3:
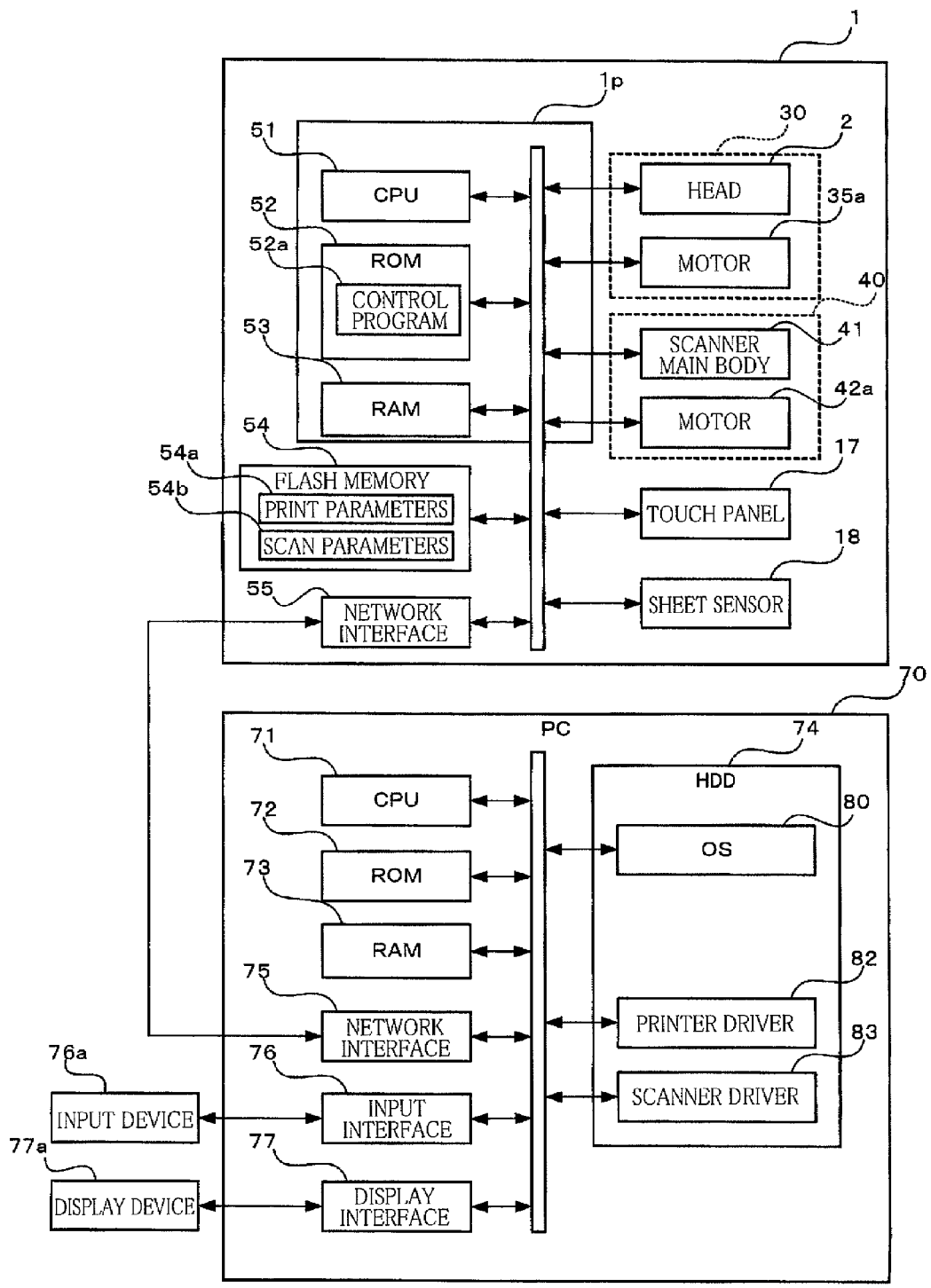
FIG. 3 is s functional block diagram of the MFP and a personal computer (PC) shown in FIG. 1.

The MFP 1 has a controller 1p as a control device. As shown in FIG. 3, the controller 1p includes a CPU 51, ROM 52, RAM 53, a flash memory 54, and a network interface 55. The controller 1p is electrically connected to the head 2, the motor 35a of the conveyor mechanism 35, the scanner main body 41, a motor 42a of the feeder, a touch panel 17, and the sheet sensor 18.

The touch panel 17 is a user interface having an input function and a display function. The touch panel 17 displays an operation status of the MFP 1 and receives an input operation by a user.

The ROM 52 stores firmware in the form of a control program 52a for controlling the MFP 1, various settings, initial values, and so on. The RAM 53 and the flash memory 54 are utilized as working areas where various control programs are read out or as storage areas where data is temporarily stored. The flash memory 54 stores operation parameters of the printer 30, i.e., print parameters 54a, operation parameters of the scanner unit 40, i.e., scan parameters 54b, and an Internet Protocol (IP) address as information unique to the MFP 1. The print parameters 54a include a printing resolution, a printing size, a sheet conveyance speed, an operation mode in printing processing executed by the printer 30. The scan parameters 54b include a scanning resolution, an operation mode, availability or nonavailability of a duplex scanning function in scanning processing executed by the scanner unit 40. The operation mode represents whether execution of a quiet mode is enabled or disabled and setting of the quiet mode is possible or not. In the quiet mode, a quiet operation is performed in which a conveyance speed of a sheet (document) is lowered, so that driving noise of motors and gears can be reduced. In the quiet mode of the printer 30, only the sheet conveyance speed is lowered without changing the printing resolution. In the quiet mode of the scanner unit 40, only the sheet conveyance speed is lowered without changing the scanning resolution.

The CPU 51 controls devices and components of the MFP 1 while storing results of processing in the RAM 53 or the flash memory 54, according to the control program 52a read from the ROM 52 and signals sent from various sensors.

The network interface 55 transmits and receives data to and from various devices, such as a personal computer (PC) 70, connected to the same local area network (LAN) as the MFP 1. Either of wireless communication and wired communication may be used for transmission and reception of the data.

The MFP 1 can execute, by execution of the control program 52a, various processing according to commands received from the touch panel 17 or from the PC 70 via the LAN (the network interface 55). The processing includes the printing processing by the printer 30 and the scanning processing by the scanner unit 40. When the printing processing is executed, the printer 30 prints, on a sheet, an image based on print data received with a command according to the print parameters 54a. When the scanning processing is executed, the scanner unit 40 scans an image printed on a sheet according to the scan parameters 54b. In the following explanation, a cooperative operation, wherein printing processing is executed such that an image based on image data obtained by execution of the scanning processing is printed on a sheet, will be referred to as copying processing.

The PC 70 includes a CPU 71, ROM 72, RAM 73, a hard disk drive (HDD) 74, a network interface 75, an input interface 76, and a display interface 77.

The network interface 75 transmits and receives data to and from various devices connected to the same LAN as the PC 70. Either of wireless communication and wired communication may be used for transmission and reception of the data.

In FIG. 3, the network interface 75 is connected to the network interface 55 of the MFP 1 via the LAN. Consequently, data communication is available between the PC 70 and the MFP 1.

An input device (a mouse and a keyboard) 76a is connected to the input interface 76. A display device (a monitor) 77a is connected to the display interface 77. The HDD 74 is installed with an operation system (OS) 80, a printer driver 82, and a scanner driver 83. The printer driver 82 corresponds to the printer 30 of the MFP 1 while the scanner driver 83 corresponds to the scanner unit 40 of the MFP 1. The CPU 71 can control operations of the MFP 1 by execution of the printer driver 82 and the scanner driver 83.

Figure 4:
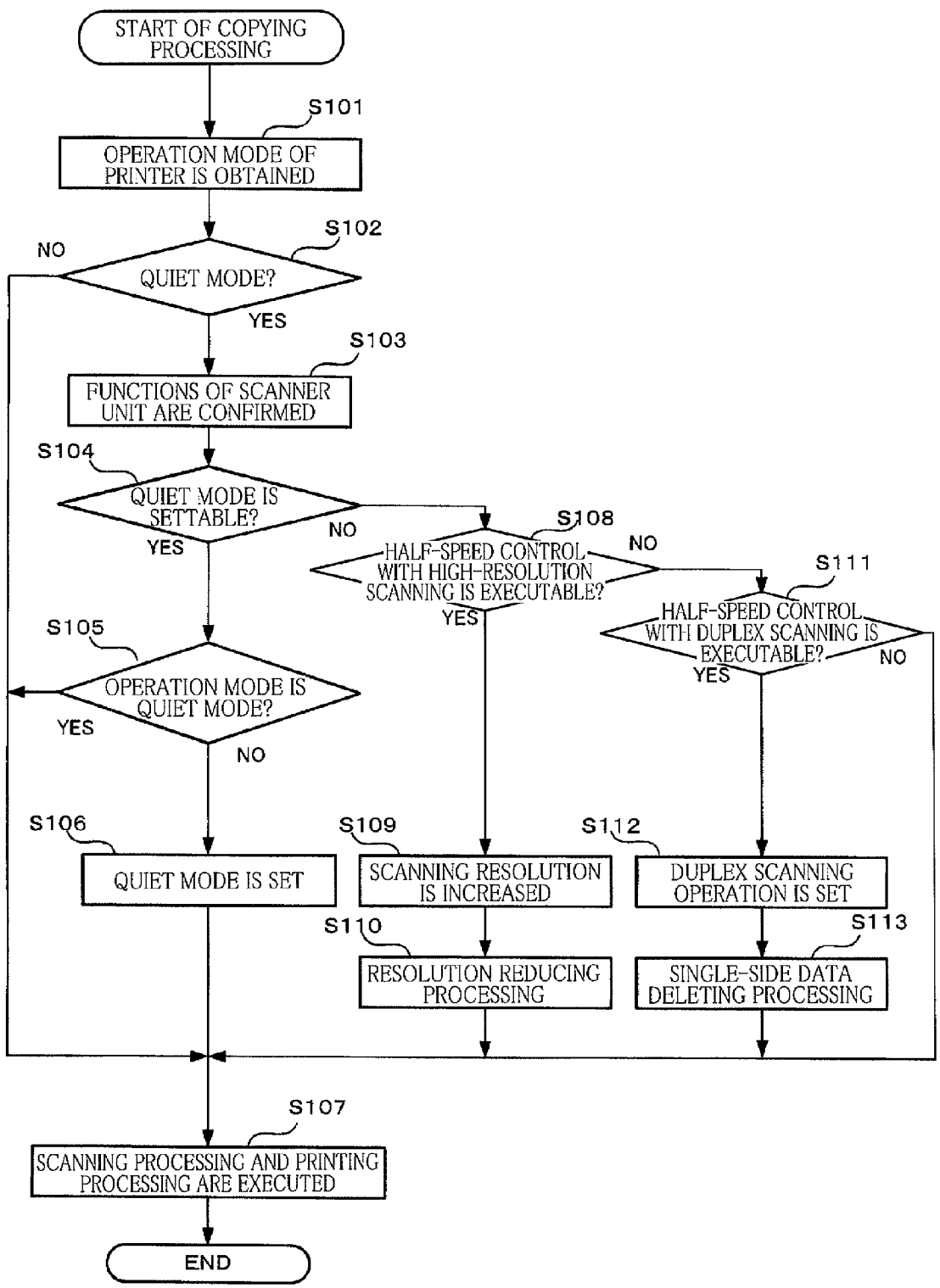
FIG. 4 is a flow chart showing a procedure of operations in copying processing executed by a controller shown in FIG. 2.

Referring to FIG. 4, a procedure of operations in the copying processing will be explained in detail. After a document is set by a user on the feeder 42 of the scanner unit 40, copying processing can be started in response to reception of a command from the PC 70 or in response to an operation by the user on the touch panel 17 of the MFP 1. In the present embodiment, there will be explained a case where copying processing is started in response to an operation on the touch panel 17. When the copying processing is started as shown in FIG. 4, the CPU 51 obtains the operation mode of the printer 30 from the print parameters 54a (S101) and determines whether the operation mode is set at the quiet mode (S102). If the CPU 51 determines that the operation mode is not set at the quiet mode (S102: NO), a cooperative operation is performed in which scanning processing for scanning an image of a document set in the scanner unit 40 is executed to obtain image data and printing processing is subsequently executed to print, on a sheet, the image based on the obtained image data (S107). Thus, the copying processing indicated by the flow chart of FIG. 4 ends.

If the CPU 51 determines that the operation mode is set at the quiet mode (S102: YES), the CPU 51 confirms, on the basis of the scan parameters 54b, functions of the scanner unit 40 (S103). In this respect, the functions of the scanner unit 40 may change depending upon whether any optional device is installed on the scanner unit 40. It is thus required for the CPU 51 to confirm the functions of the scanner unit 40 every time the copying processing is executed. The CPU 51 then determines whether the quiet mode is settable for the scanner unit 40 (S104). If the CPU 51 determines that the quiet mode is settable (S104: YES), the CPU 51 determines whether the operation mode in the scan parameters 54b is set at the quiet mode (S105). If the CPU 51 determines that the operation mode is set at the quiet mode (S105: YES), the processing proceeds to S107. On the other hand, if the CPU 51 determines that the operation mode in the scan parameters 54b is not set at the quiet mode (S105: NO), the operation mode in the scan parameters 54b is set to the quiet mode (S106) and the cooperative operation of the scanning processing and the printing processing is performed (S107). Thus, the copying processing indicated by the flow chart of FIG. 4 ends.

If the CPU 51 determines that the quiet mode is not settable (S104: NO), the CPU 51 determines whether a half-speed control with high-resolution scanning is executable (S108). The half-speed control with high-resolution scanning causes the scanner unit 40 to perform a quiet operation in which scanning at a resolution twice as high as the scanning resolution in the scan parameters 54b is performed for thereby reducing a document conveyance speed in the feeder 42 to half. For instance, where only one scanning resolution can be designated, in other words, two or more scanning resolutions cannot be designated, the half-speed control with high-resolution scanning cannot be executed. If the CPU 51 determines that the half-speed control with high-resolution scanning is executable (S108: YES), the CPU 51 sets the scanning resolution in the scan parameters 54b so as to be doubled for high resolution (S109). Further, the CPU 51 sets the resolution of image data which is obtained by the scanning processing in a direction of conveyance of a document by the feeder 42 (resolution reducing processing: S110) so as to be reduced to half. Subsequently, the cooperative operation of the scanning processing and the printing processing is performed (S107). In this instance, the resolution of the image data obtained in the scanning processing is reduced according to the settings described above, and the printing processing is executed to print an image based on the image data having the reduced resolution. Thus, the copying processing indicated by the flow chart of FIG. 4 ends.

If the CPU 51 determines that the half-speed control with high-resolution scanning is not executable (S108: NO), the CPU 51 determines whether a half-speed control with duplex scanning is executable (S111). The half-speed control with duplex scanning causes the scanner unit 40 to perform a quiet operation in which duplex scanning is performed for thereby reducing the document conveyance speed in the feeder 42 to half. Because data processing amount per unit time in duplex scanning is twice as large as that in single-sided scanning, the document conveyance speed needs to be reduced to half. For instance, where the scanner main body 41 is configured not to be able to perform duplex scanning, the half-speed control with duplex scanning cannot be executed. If the CPU 51 determines that the half-speed control with duplex scanning is executable (S111: YES), a duplex scanning operation is set in the scan parameters 54b (S112). Further, the CPU 51 sets deletion of the image data obtained in the scanning processing for one of the opposite surfaces of the document (single-side data deleting processing: S113). Subsequently, the cooperative operation of the scanning processing and the printing processing is performed (S107). In this instance, the image data obtained in the scanning processing for the one of the opposite surfaces of the document is deleted according to the settings described above, and the printing processing is executed to print an image based on the image data obtained for the other of the opposite surfaces of the document. Thus, the copying processing indicated by the flow chart of FIG. 4 ends.

In the MFP 1 according to the first embodiment illustrated above, where the operation mode of the printer 30 is set at the quiet mode, the scanner unit 40 is permitted to perform the quiet operation, reducing impairment of quietness.

Further, the quiet operation is performed by reducing the conveyance speed of the sheet (document), thus easily achieving quietness.

Moreover, even where the quiet mode is not settable for the scanner unit 40, the half-speed control with high-resolution scanning or the half-speed control with duplex scanning can reduce impairment of quietness.

When the half-speed control with high-resolution scanning or the half-speed control with duplex scanning is executed, the resolution of the image data obtained in the scanning processing is increased or the image data for both surfaces of the document is obtained. However, the resolution reducing processing or the single-side data deleting processing is executed before the printing processing is executed, so that an image as desired by a user is printed.

Second Embodiment

Referring next to the flow chart of FIG. 5, there will be explained a second embodiment of the present invention. In the second embodiment, the same reference numerals as used in the illustrated first embodiment are used to identify substantially the same components, and an explanation thereof is dispensed with. The second embodiment differs from the first embodiment only in a procedure of operations in the copying processing, which will be mainly explained in the following description.

Figure 5:
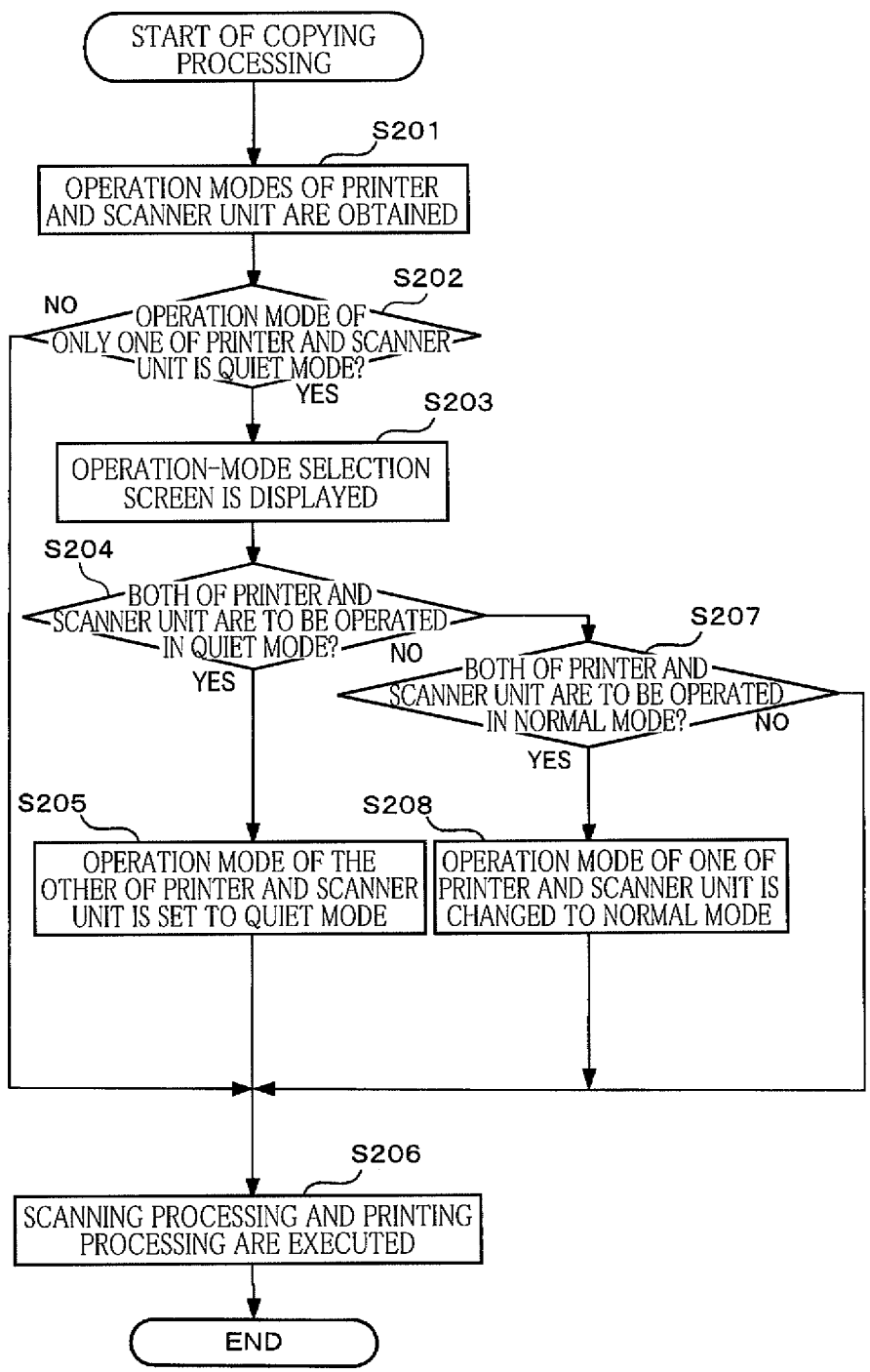
FIG. 5 is a flow chart showing a procedure of operations in copying processing according to a second embodiment of the present invention.

When the copying processing is started as shown in FIG. 5, the CPU 51 obtains the operation mode of the printer 30 from the print parameters 54a and the operation mode of the scanner unit 40 from the scan parameters 54b (S201). The CPU 51 then determines whether the operation mode of only one of the printer 30 and the scanner unit 40 is set at the quiet mode (S202). If a negative determination is made, in other words, if the CPU 51 determines that the operation mode of each of the printer 30 and the scanner unit 40 is set at the quiet mode or the normal mode (S202: NO), a cooperative operation is performed in which scanning processing for scanning an image of a document set in the scanner unit 40 is executed to obtain image data and printing processing is subsequently executed to print, on a sheet, the image based on the obtained image data (S206). Thus, the copying processing indicated by the flow chart of FIG. 5 ends. In the normal mode, each of the printer 30 and the scanning unit 40 operates in parameters that ensure optimum working efficiency when the printer 30 or the scanning unit 40 operates at a resolution, i.e., a printing resolution for the printer 30 or a scanning resolution for the scanning unit 40, that the user has directly designated.

If the CPU 51 determines that the operation mode of only one of the printer 30 and the scanner unit 40 is set at the quiet mode (S202: YES), the CPU 51 controls the touch panel 17 to display a selection screen that prompts the user to select whether each of the printer 30 and the scanner unit 40 is to be operated in the quiet mode (S203). Specifically, the selection screen prompts the user to select one of: (A) both of the printer 30 and the scanner unit 40 are operated in the quiet mode; (B) both of the printer 30 and the scanner unit 40 are operated in the normal operation mode; and (C) the one of the printer 30 and the scanner unit 40 for which the quiet mode is set is operated in the quiet mode and the other of the printer 30 and the scanner unit 40 is operated in the normal operation mode.

If the CPU 51 determines based on an operation on the touch panel 17 by the user that the user has selected the above-indicated option (A), namely, both of the printer 30 and the scanner unit 40 are operated in the quiet mode (S204: YES), the CPU 51 sets, to the quiet mode, the operation mode of the other of the printer 30 and the scanner unit 40 for which the quiet mode is not set (S205). Subsequently, the cooperative operation is performed in which the scanning processing for scanning an image of a document set in the scanner unit 40 is executed to obtain image data and the printing processing is subsequently executed to print, on a sheet, the image based on the obtained image data (S206). Thus, the copying processing indicated by the flow chart of FIG. 5 ends.

If the CPU 51 determines based on an operation on the touch panel 17 by the user that the user has selected the above-indicated option (B), namely, both of the printer 30 and the scanner unit 40 are operated in the normal operation mode (S207: YES), the CPU 51 changes, from the quiet mode to the normal operation mode, the operation mode of the one of the printer 30 and the scanner unit 40 for which the quiet mode is set (S208). Subsequently, the cooperative operation is performed in which the scanning processing for scanning an image of a document set in the scanner unit 40 is executed to obtain image data and the printing processing is subsequently executed to print, on a sheet, the image based on the obtained image data (S206). Thus, the copying processing indicated by the flow chart of FIG. 5 ends.

If the CPU 51 determines based on an operation on the touch panel 17 by the user that the user has selected the above-indicated option (C), namely, one of the printer 30 and the scanner unit 40 for which the quiet mode is set is operated in the quiet mode and the other of the printer 30 and the scanner unit 40 is operated in the normal operation mode (S207: NO), the cooperative operation is performed in which the scanning processing for scanning an image of a document set in the scanner unit 40 is executed to obtain image data and the printing processing is subsequently executed to print, on a sheet, the image based on the obtained image data (S206). Thus, the copying processing indicated by the flow chart of FIG. 5 ends.

In the MFP according to the second embodiment illustrated above, where the operation mode of only one of the printer 30 and the scanner unit 40 is set at the quiet mode, the other of the printer 30 and the scanner unit 40 is permitted to perform the quiet operation by the selection made by the user, reducing impairment of quietness.

Further, the user can select desired combinations of the operation modes of the printer 30 and the scanner unit 40 according to any one of the above-indicated options (A)-(C), so that operability for the user is enhanced.

Third Embodiment

Figure 6:
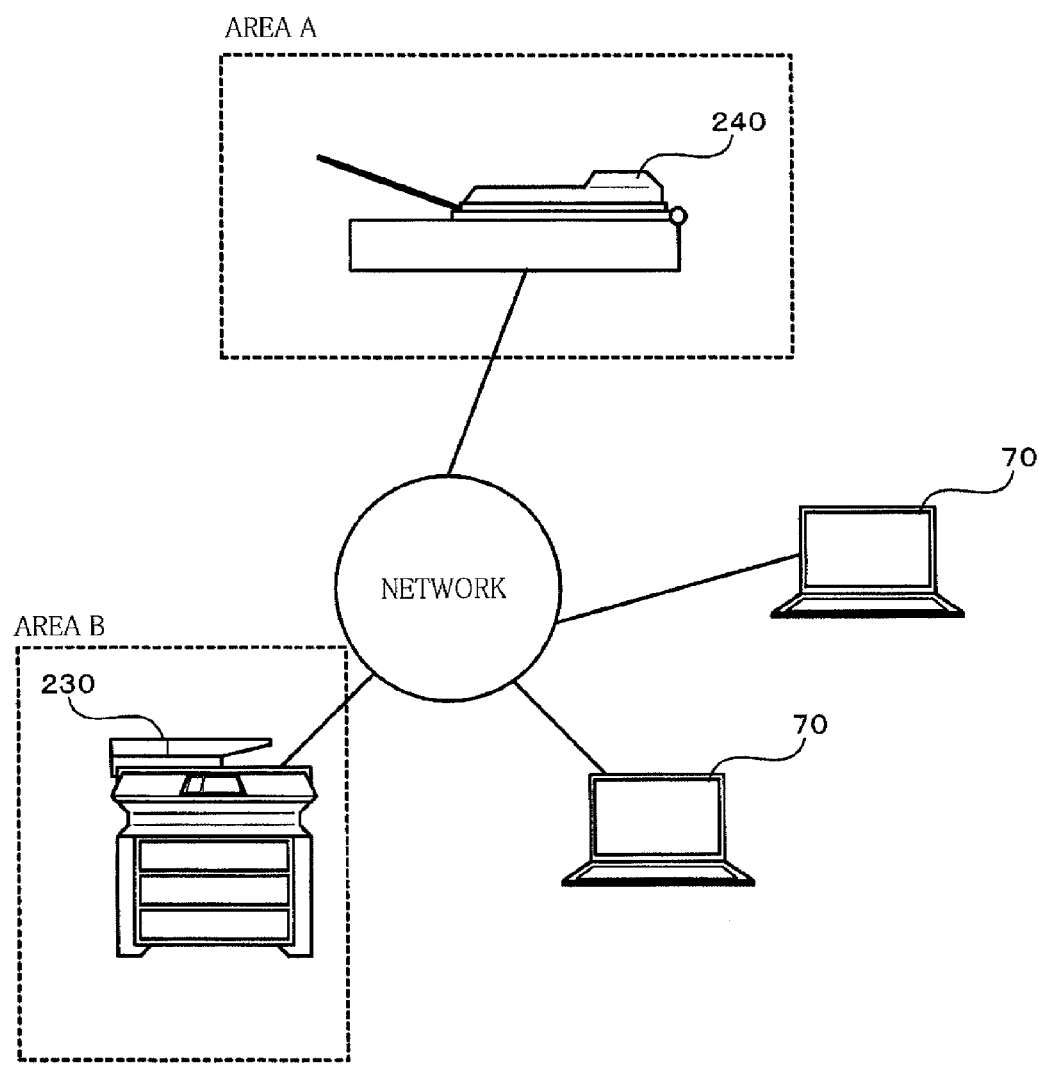
FIG. 6 is a schematic view showing a network according to a third embodiment of the present invention.
Figure 7:
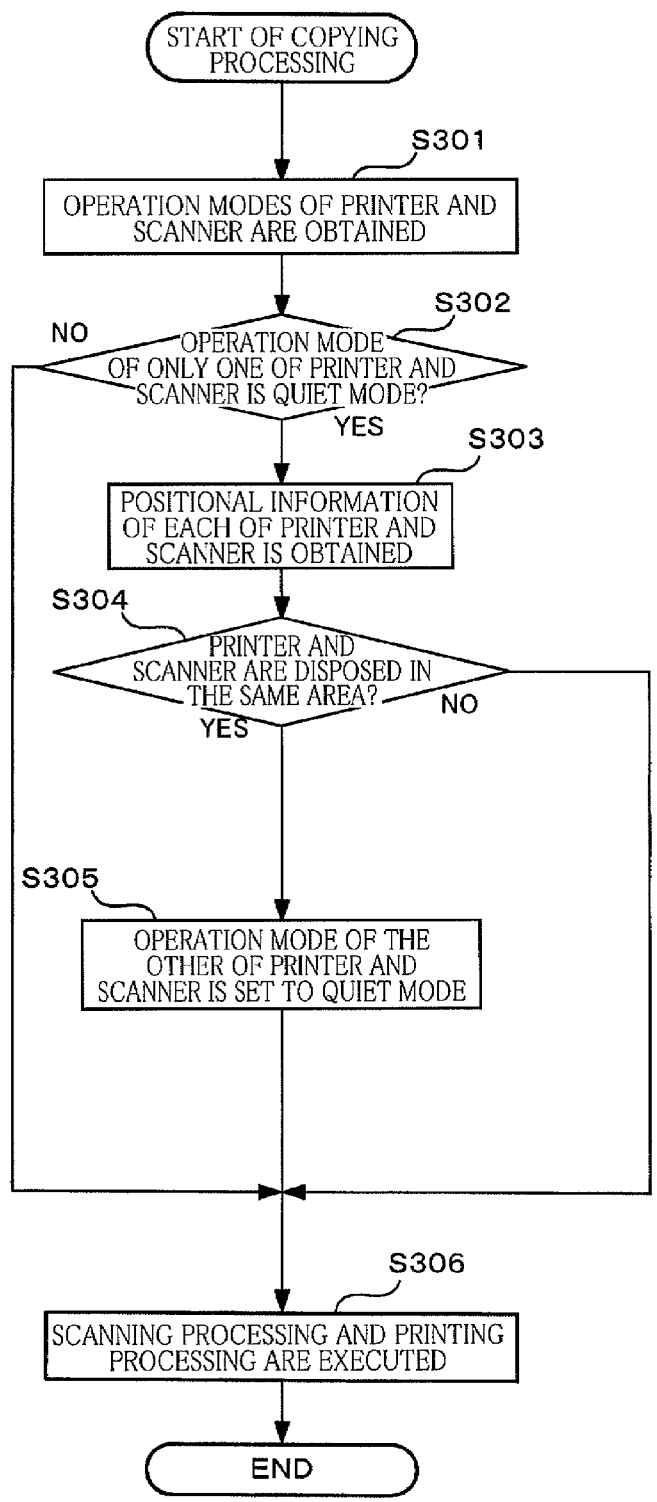
FIG. 7 is a flow chart showing a procedure of operations in copying processing according to a third embodiment of the present invention.

Referring next to FIGS. 6 and 7, there will be explained a third embodiment of the invention. In the third embodiment, the same reference numerals as used in the illustrated first embodiment are used to identify substantially the same components, and an explanation thereof is dispensed with.

The principle of the invention is applied to the controller of the MFP having the printer and the scanner unit in the first and second embodiments illustrated above. The printer and the scanner unit may be independent of each other. In the third embodiment, the principle of the invention is applied to a printer driver and a scanner driver installed on each PC 70 connected to the same network as a printer 230 and a scanner 240, as shown in FIG. 6. Print parameters stored in the printer 230 include an installation area of the printer 230 and scan parameters stored in the scanner 240 include an installation area of the scanner 240. The print parameters and the scan parameters also include a distance between the respective installation areas. In FIG. 6, the scanner 240 is disposed in an area A, and the printer 230 is disposed in an area B.

When the copying processing starts as shown in FIG. 7, the CPU 71 of the PC 70 obtains, via the network communication, respective operation modes of the printer 230 and the scanner 240 therefrom (S301) and determines whether the operation mode of only one of the printer 230 and the scanner 240 is set at the quiet mode (S302). If a negative determination is made, in other words, if the CPU 71 determines that the operation mode of each of the printer 30 and the scanner unit 40 is set at the quiet mode or the normal mode (S302: NO), the CPU 71 sends a command to the scanner 240 for permitting the scanner 240 to execute the scanning processing and receives image data obtained as a result of the scanning processing. Further, the CPU 71 sends a command, together with the received image data to the printer 230, and permits the printer 230 to execute the printing processing such that an image based on the received image data is printed on a sheet (the cooperative operation: S306). Thus, the copying processing indicated by the flow chart of FIG. 7 ends.

If the CPU 71 judges that the operation mode of only one of the printer 230 and the scanner unit 240 is set at the quiet mode (S302: YES), the CPU 71 obtains an installation area of each of the printer 230 and the scanner unit 240 (S303), and determines whether the printer 230 and the scanner unit 240 are disposed in the same installation area (S304). If the CPU 71 determines that the printer 230 and the scanner unit 240 are not disposed in the same installation area (S304; NO), the cooperative operation is performed in which the scanner 240 executes the scanning processing and the printer 230 executes the printing processing (S306). Thus, the copying processing indicated by the flow chart of FIG. 7 ends.

If the CPU 71 determines that the printer 230 and the scanner unit 240 are disposed in the same installation area (S304; YES), the operation mode of the other of the printer 230 and the scanner unit 240 is set to the quiet mode (S305) and the cooperative operation is performed in which the scanner 240 executes the scanning processing and the printer 230 executes the printing processing (S306). Thus, the copying processing indicated by the flow chart of FIG. 7 ends.

In the MFP according to the third embodiment illustrated above, where the operation mode of only one of the printer 230 and the scanner 240 is set at the quiet mode and the printer 230 and the scanner 240 are disposed in the same area, the other of the printer 230 and the scanner 240 is permitted to perform the quiet operation, reducing impairment of quietness.

Further, only when the printer 230 and the scanner unit 240 are disposed in the same area, the other of the printer 230 and the scanner 240 is permitted to perform the quiet operation. Consequently, when the printer 230 and the scanner unit 240 are disposed in mutually different installation areas, the throughput of the printer 230 and the scanner 240 can be increased without quietness taken into consideration.

Other Embodiments

It is to be understood that the above embodiments are described by way of example and the invention is not limited to the details of the illustrated embodiments. The invention may be embodied with various changes and modifications without departing from the spirit and scope of the invention defined in the appended claims. In the first embodiment, the quiet operation is performed by reducing the conveyance speed of the sheet (the document). Where the quiet mode is not settable, the printer 30 or the scanner unit 40 may be operated only in the normal mode.

In the first embodiment, where the quiet mode is not settable in the scanner unit 40, it is first determined whether the half-speed control with high-resolution scanning is executable and subsequently determined whether the half-speed control with duplex scanning is executable. It may be first determined whether the half-speed control with duplex scanning is executable and subsequently determined whether the half-speed control with high-resolution scanning is executable. One of the determination for the half-speed control with high-resolution scanning and the determination for the half-speed control with duplex scanning may be omitted.

In the first embodiment, when the half-speed control with high-resolution scanning is executed, the resolution reducing processing is executed on the image data obtained as a result of the scanning processing. The resolution reducing processing may be omitted. In this instance, it is preferable that the printer executes the printing processing based on the image data whose resolution is forcibly reduced. For instance, when the printer receives image data whose resolution exceeds a maximum printable resolution for the printer, the printer executes the printing processing at the maximum resolution, irrespective of the resolution of the received image data.

In the illustrated first embodiment, S101, S102, and S103 in FIG. 4 may be replaced with S201, S202 of FIG. 5.

Where it is predetermined that the quiet mode is not settable in the scanner unit 40 in the first embodiment, S108 may be implemented after S101 by skipping S102, S103, S104, S105, S106. Where it is also predetermined that only one of the half-speed control with high-resolution scanning and the half-speed control with duplex scanning is executable, only S109 and S110 among S108-S113 or only S112 and S113 among S108-S113 may be implemented.

In the illustrated third embodiment, the controller may be disposed in the printer 230 or the scanner 240.

In the illustrated third embodiment, a plurality of recording devices and a plurality of reading devices may be connected the same network as the PCs 70. In this instance, the CPU 71 obtains at S301 the operation modes of all of the printers and the scanners used in the copying processing. The CPU 71 determines at S302 whether one of the operation mode of at least one printer and the operation mode of at least one scanner is set at the quiet mode and the other of the operation mode of the at least one printer and the operation mode of the at least one scanner is not set at the quiet mode. If the CPU 71 determines that both operation modes are set at the quiet mode or the normal mode (S302: NO), the processing proceeds to S306. If the CPU 71 determines that one of the operation mode of the at least one printer and the operation mode of the at least one scanner is set at the quiet mode and the other of the operation mode of the at least one printer and the operation mode of the at least one scanner is not set at the quiet mode (S302: YES), the processing proceeds to S303. The CPU 71 then determines at S304 whether the at least one printer or the at least one scanner that is not set at the quiet mode and the at least one printer or the at least one scanner that is set at the quiet mode are disposed in the same area.

The control explained with respect to the first and second embodiments may be executed in a network structure similar to that in the third embodiment shown in FIG. 6. The PCs 70 may be replaced with mobile terminals such as mobile phones and tablets. In this instance, each mobile terminal is installed with an application for controlling the printer and the scanner, in place of the printer driver and the scanner driver. This application executes the processing indicated by the flow chart of FIG. 7.

What is claimed is:

1. A non-transitory storage medium storing a program executed by a computer of a control device configured to control a recording device configured to record an image on a recording medium while conveying the recording medium and a reading device configured to read an image recorded on a recording medium while conveying the recording medium, wherein, when the control device receives a command for a cooperative operation in which the reading device reads an image from a recording medium and the recording device records the read image on a recording medium, the program causes the control device to:

obtain operation mode information of the recording device, the operation mode information relating to an operation mode set for the recording device;

obtain operation mode information of the reading device, the operation mode information relating to an operation mode set for the reading device;

determine whether the operation mode of a first device that is one of the recording device and the reading device is in a quiet mode based on the obtained operation mode information and whether the operation mode of a second device that is another of the recording device and the reading device is not in the quiet mode based on the obtained operation mode information; and when it is determined that the operation mode of the first device is in the quiet mode and it is determined that the operation mode of the second device is not in the quiet mode, control the first device to remain in the quiet mode and control the second device to change the operation mode thereof to the quiet mode to perform a quiet operation.

2. The storage medium according to claim 1, wherein the quiet operation, which is executed when the operation mode is the quiet mode, is an operation in which a conveyance speed of the recording medium is reduced.

3. The storage medium according to claim 1, wherein the quiet operation includes an operation in the quiet mode.

4. The storage medium according to claim 3, wherein the program causes the control device to control the reading device so as to operate in a high-resolution reading mode in which the reading device performs reading in a resolution that is increased at least in a conveyance direction of the recording medium where the second device is the reading device and the quiet mode is not settable in the reading device as the operation mode.

5. The storage medium according to claim 4, wherein the program causes the control device to control the recording device to record, on the recording medium, an image which has been read by the reading device in the high-resolution reading mode and whose resolution has been reduced.

6. The storage medium according to claim 4,
wherein the program causes the control device to:
obtain, from the reading device, image data of the image that has been read from the recording medium by the reading device in the high-resolution reading mode;
execute, on the obtained image data, resolution reducing processing for reducing a resolution of the image; and
control the recording device to record an image based on the image data on which the resolution reducing processing has been executed.

7. The storage medium according to claim 4,
wherein the program causes the control device to:
obtain, from the reading device, image data of the image that has been read from the recording medium by the reading device in the high-resolution reading mode; and
control the recording device to record, on the recording medium, the image based on the obtained image data while reducing a resolution of the image.

8. The storage medium according to claim 1,
wherein the program causes the control device to:
obtain positional information relating to a position of each of the recording device and the reading device;
determine whether a distance between the recording device and the reading device indicated by the obtained positional information is equal to or larger than a predetermined distance; and
where the operation mode of the first device is the quiet mode and even where the operation mode of the second device is not in the quiet mode, control the second device not to change the operation mode to the quite mode only where the control device determines that the distance is equal to or larger than the predetermined distance.

9. The non-transitory storage medium according to claim 1, wherein the first device is the recording device and the second device is the reading device.

10. The non-transitory storage medium according to claim 1, wherein the program causes the control device to determine whether or not to control the second device to change the operation mode thereof to the quiet mode to perform the quiet operation according to a result of selection by a user.

11. The storage medium according to claim 10, wherein, when the control device determines, according to the result of selection by the user, to control the second device not to change the operation mode to the quiet mode, the program further causes the control device to control the recording device and the reading device according to one of the following two options: (a) the control device controls the first device to perform the quiet operation and the second device not to perform the quiet operation; and (b) the control device controls both of the first and second devices not to perform the quiet operation.

12. An image processing apparatus, comprising:
a recording device configured to record an image on a recording medium while conveying the recording medium;
a reading device configured to read an image recorded on a recording medium while conveying the recording medium; and
a control device configured to control the recording device and the reading device,
wherein, when the control device receives a command for a cooperative operation in which the reading device reads an image from a recording medium and the recording device records the read image on a recording medium, the control device:
obtains, operation mode information of the recording device, the operation mode information relating to an operation mode set for the recording device;
obtains operation mode information of the reading device, the operation mode information relating to an operation mode set for the reading device;
determine whether the operation mode of a first device that is one of the recording device and the reading device is in a quiet mode based on the obtained operation mode information and whether the operation mode of a second device that is another of the recording device and the reading device is not in the quiet mode based on the obtained operation mode information; and
when it is determined that the operation mode of the first device is in the quiet mode and it is determined that the operation mode of the second device is not in the quiet mode, control the first device to remain in the quiet mode and control the second device to change the operation mode thereof to the quiet mode to perform a quiet operation.

13. The image processing apparatus according to claim 12, wherein the first device is the recording device and the second device is the reading device.

14. The image processing apparatus according to claim 12, wherein the control device determines whether or not to control the second device to change the operation mode thereof to the quiet mode to perform the quiet operation according to a result of selection by a user.

* * * * *